April 10, 1934.　　　F. W. MILLER　　　1,954,018

VALVE

Filed Dec. 1, 1931

Inventor
Frank W. Miller
by
Attorney

Patented Apr. 10, 1934

1,954,018

UNITED STATES PATENT OFFICE 1,954,018

VALVE

Frank W. Miller, Philadelphia, Pa., assignor to Yarnall-Waring Company, Philadelphia, Pa., a corporation of Pennsylvania Application December 1, 1931, Serial No. 578,258

9 Claims. (Cl. 251—113)

My invention relates to hydraulic valves and has for an object to provide a thoroughly efficient seal for the valve content.

A further purpose is to oppositely and transversely support the central rotatable section by upper and lower packing retaining members.

A further purpose is to provide U-cup leathers of the pressure-packed variety on opposite transverse sides of a moving valve member.

A further purpose is to provide sealing bushings of novel design, the tension of which can be adjusted.

A further purpose is to provide a washer of special design for a U-shaped cup leather, which affords a rest for the edges of the cup leather and at the same time prevents wear of the edges.

Further purposes will appear in the specification and in the claims.

I have elected to show two only of the possible forms of my invention, selecting however forms that are practical and efficient in operation and which well illustrate the principles involved.

Like numerals refer to like parts in all figures.

Figure 1:
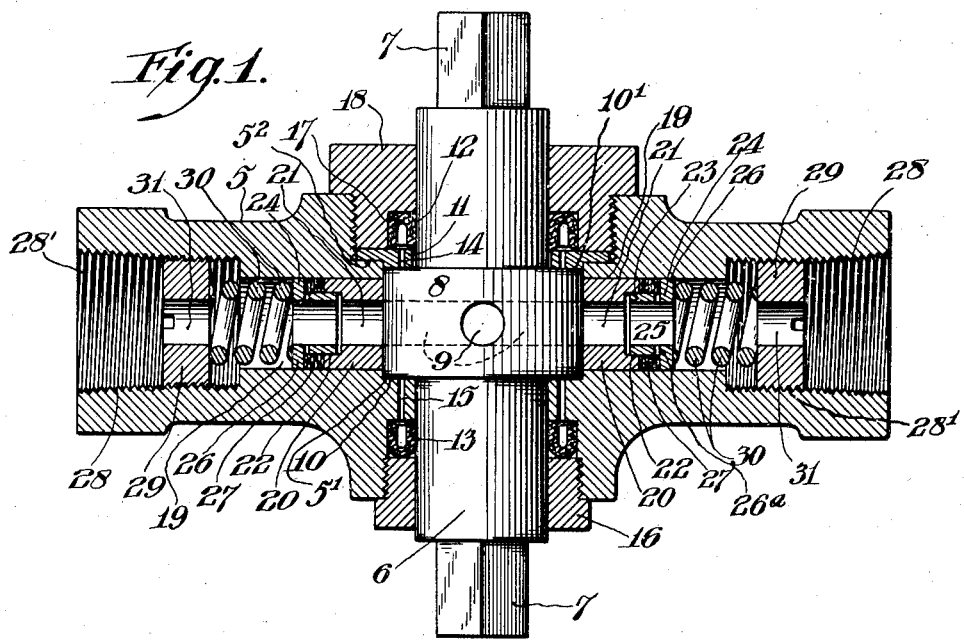
Figure 1 is a section through a three-way hydraulic high pressure valve embodying several features of my invention.

Describing in illustration and not in limitation and referring to the drawing:—

In the embodiment of my invention illustrated in Figure 1, 5 designates the body portion of my valve, and 6 the plug. The ends of the plug are provided with squared extensions 7—7 for the reception of an operating lever not shown. The central portion or hub 8 of the plug is ported as at 9, and the turning of the plug within the casing 5 establishes communication or cuts off continuous passage (as the case may be) between the various connecting pipes, and for exhaust to atmosphere.

One plane face of the central portion or hub 8 is seated at 10 against surface 5' within the main body portion, and a washer 11 forms the seat for the corresponding opposite plane face 10' of the hub. The washer also engages surface 5² of the body.

In order that the fluid content valved be prevented from leaking out past the plug, I provide annular cupped leathers 12 and 13. These leathers are pressure-packed through ports 14, 15 communicating between paths of pressure leakage and the cups 12, 13.

At 16, I show a collar screwed into the body portion of the valve which, when in place, forms a retaining member for the annular cupped leather 13. The opposite cupped leather 12 rests upon the washer 11 and is retained with annular recess 17 of a collar 18. Both collars are threaded to place and the collar 18 holds the washer 11 against the face 10' of the hub and against surface 5² in the body.

In each of the communicating ports 19 of the valve I provide sealing bushings 20. These bushings bear directly against the cylindrical faces of the central portion 8 of the plug 6 and are ported as at 21 to register with the ports 9 of the plug 6. The ends of the bushings farthest from the plug 6 are recessed as at 22 to receive the reduced ends 23 of packing glands 24, and the ends 23 are slidable within the recesses. The packing gland 24 is ported at 25 in registration with the port 21 of the bushing 20.

The outward ends of the glands 24 are flanged as at 26, and the flanges ride within the bore 19 in the body portion 5. Packings 27 are interposed between these flanges and the outward ends of the sealing bushing 20 and surround the reduced ends 23. A series of short passageways 26a communicate with the packing 27 from the port 25 to apply pressure to the packing.

The outermost ends of the body portion of the valve casing 5 are taper tapped as at 28 for the reception of the usual pipes (not shown) comprising the system, and are threaded at 28' inside the taper to the same pitch as the tapered thread to receive retaining bushings 29 which compress springs 30 between them and the flanges 26. The bushings 29 are ported at 31 to permit the passage of fluid under pressure.

Figure 2:
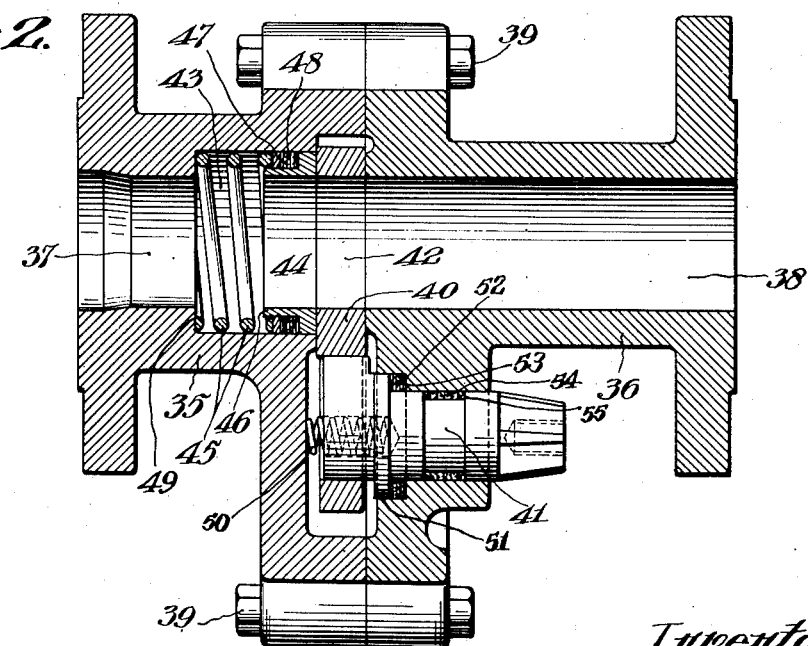
Figure 2 is a section through a double tightening valve of the swing gate type embodying some of the features of my invention.

In the form of my invention illustrated in Figure 2, I show a structure as applied to gate valves of the double tightening type wherein 35 and 36 designate the body portions, 37 a passage in the body portion 35, and 38 a corresponding passage in the body portion 36. The two sections of the body are held together by a series of bolts 39 and enclose between them the usual swinging gate disc 40 common to all valves of this type. The disc is operated from a stem 41 and includes a passage 42 which registers with openings 37 and 38 when the gate disc is in a certain position.

A chamber 43 forms an enlarged continuation of the passage 37 in the body portion 35. Within it I slidably mount a sealing bushing 44 which is held tightly against one face of the gate disc 40 by the action of a spring 45. This spring bears against a gland in the form of a washer 47 surrounding a reduced portion 46 of the sealing bushing 44. Packing 48 is compressed between the washer and the enlarged end (comprising the full diameter) of the sealing bushing. It will thus be seen that the packing is continuously under compression of the spring 45, which compression tends to keep it tight against the inner wall of chamber 43, thereby increasing the seating efficiency to retain the fluid pressure.

It will be evident that the packing gland 24 and the washer gland 47 both perform gland functions, both compressing the packing and using the compression of the packing as a means of forcing the bushing 20 or the bushing 44 against the valve member at a pressure proportionate to the compression of the packing.

It will be evident that the hollow plug 29, for example, of Figure 1 and the shoulder 49 against which the spring abuts in Figure 2 both perform abutment functions in holding the spring to its duty with an additional function in the form of Figure 1 in that the pressure of the spring can be adjusted. They differ in ways affected by the manufacture and not functionally after both are in place.

The stem 41 is outwardly pressed by spring 50 so as to cause shoulder 51 to compress packing 52 against the bottom 53 of a recess formed in the portion 36 of the body. The stem is grooved at 54 to receive packing 55.

It will be evident that the face of disc 11 pressing against the end of the hub performs the same function as the body of the valve does in supporting the end of the hub at 10, the differences in this case as in the cases above being differences due to convenience of construction or capability of assemblage rather than differences in kind.

It will be evident that the splitting up of the body of the valve in Figure 2 into two parts joined by bolts is a matter of convenience also and that the plane at which they are split may be varied if desired.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. In a valve, a valve body having inlet and outlet valve passages and a valve plug, the latter having an enlarged hub portion and a passage through the hub to direct the fluid flow through the hub, a hollow bushing within one of the body passages sealing against the circumference of the hub, a packing gland having an end telescoping with the bushing, hollow packing between the gland and the sleeve and a spring pressing against the gland and, through it and the packing, forcing the bushing against the hub.

2. In a valve, a hollow valve body and a valve plug, the latter having an enlarged hub portion apertured to direct fluid flow through the hub and having a lateral shoulder, a wall forming a relatively fixed sealing surface engaging the lateral surface of the hub and apertured to pass leakage fluid pressure through it, an annular cup washer having one face bearing against the plug and the other face against a relatively fixed member and receiving the leakage fluid within its interior and a plug holding the cup washer in position.

3. In a valve, a hollow valve body and a valve plug, the latter having an enlarged hub portion apertured to direct fluid flow through the hub and having a lateral shoulder, a wall forming a relatively fixed sealing surface engaging the lateral shoulder of the hub and apertured to pass leakage fluid pressure through it, an annular cup washer having an inner face bearing against the plug and the outer face against a relatively fixed member and receiving the leakage fluid within its interior and an annular plug having an annular space within it for the cup washer and holding the cup washer in place.

4. In a valve, a hollow valve body and a valve plug, the latter having an enlarged hub portion apertured to direct fluid flow through the hub and having a lateral shoulder, a wall forming a relatively fixed sealing surface engaging the lateral shoulder of the hub and apertured to pass leakage fluid pressure through it, an annular cup washer lying within a ring recess in the valve body and having an inner face presented as a cup across the aperture and the other face against a relatively fixed member and receiving the leakage fluid within its interior, said fixed member comprising an annular plug pressing upon the convex bend of the cup washer and holding the washer in place.

5. In a valve, a valve body and a valve plug, the latter having an enlarged hub portion apertured to direct the fluid flow through the hub, a bushing sealing against the circumference of the hub, a packing gland having an end telescoping with the bushing and having an outward flange across and longitudinally spaced from the end of the bushing and being radially apertured outwardly of the said telescoping portion to pass fluid pressure through it, packing between the gland and the bushing and a spring pressing against the gland and through it and the packing forcing the sleeve against the hub.

6. In a valve, a valve body and a valve plug, the latter having an enlarged hub portion apertured to direct the fluid flow through the hub, a bushing sealing against the circumference of the hub, a packing gland having an end telescoping with the bushing and having an outward flange across and longitudinally spaced from the end of the bushing, packing between the gland and the bushing and a spring pressing against the gland and through it and the packing forcing the bushing against the hub, and a hollow plug threaded into the valve body and pressing against the spring.

7. A valve body having a passage through it from end to end and adapted for conduit connection at the ends of the passage, a valve plug rotatably mounted within the body and having an enlarged apertured hub, spring pressed sleeve means for sealing against the circumferential surface of the hub and sealing means for the end surfaces of the enlarged hub providing each a seat engaging the end surface and apertured to allow flow of leakage fluid outwardly through it, an annular cup washer concaved toward the aperture and having an inner face engaging the circumferential surface of the plug and an outer face engaging an interior fixed wall concentric with the plug, and means for holding the washer in position.

8. A valve member having a body provided with a passage through it and a lateral bore into the passage, said bore having an outer counterbore, a valve plug in the body having an enlarged portion of the plug in the form of a hub and having a stem fitting an inner portion of the lateral bore of the body, sealing means within the passaage bearing against the circumferential surface of the hub and sealing means for the side surface of the hub comprising a plane annular seat within the body of the valve engaging an end surface of the hub and apertured away from the hub into the counterbore, an annular cup washer surrounding the stem within the counterbore and having the concave face of the cup toward the aperture, and an annular plug fitting into the body and compressing the annular washer axially.

9. A valve member having a body provided with a passage through it, a valve plug in the body having an enlarged portion of the plug in the form of a hub, sealing means within the passage bearing against the circumferential surface of the hub and sealing means for the side surface of the hub comprising a disc engaging the body of the valve and also engaging an end face of the hub and apertured away from the hub, an annular plug secured within the valve body and positioning the valve plug and having a counterbore about the plug and a cup washer within the counterbore having its concave face toward the aperture in the disc and engaging the valve plug on the inner side and the inner circumferential wall of the counterbore on the outer side.

FRANK W. MILLER.